US007146999B2

(12) United States Patent
Giese et al.

(10) Patent No.: US 7,146,999 B2
(45) Date of Patent: Dec. 12, 2006

(54) MODULAR FLUID HANDLING DEVICE

(75) Inventors: Gregory C. Giese, P.O. Box 5617, Madison, WI (US) 53705; Tye Travis Gribb, Madison, WI (US)

(73) Assignee: Gregory C. Giese, Madison, WI (US)

( * ) Notice: Subject to any disclaimer, the term of this patent is extended or adjusted under 35 U.S.C. 154(b) by 59 days.

(21) Appl. No.: 11/075,313

(22) Filed: Mar. 8, 2005

(65) Prior Publication Data

US 2006/0201563 A1    Sep. 14, 2006

(51) Int. Cl.
*F16K 11/20*    (2006.01)
(52) U.S. Cl. ............... 137/269; 137/884; 285/124.5; 422/99
(58) Field of Classification Search ........... 137/269, 137/884, 271; 251/367; 285/124.1, 124.5; 422/99, 103, 104
See application file for complete search history.

(56) References Cited

U.S. PATENT DOCUMENTS

| | | | | |
|---|---|---|---|---|
| 2,834,368 | A | * | 5/1958 | Gray ........................ 137/271 |
| 3,589,387 | A | * | 6/1971 | Raymond .................. 137/261 |
| 3,831,953 | A | | 8/1974 | Leibfritz et al. |
| 4,082,324 | A | * | 4/1978 | Obrecht ................... 285/124.5 |
| 4,971,771 | A | | 11/1990 | Stahl |
| 5,385,712 | A | | 1/1995 | Sprunk |
| 5,651,941 | A | * | 7/1997 | Stark et al. ................ 422/104 |
| 5,841,036 | A | | 11/1998 | Mayeaux |
| 5,881,773 | A | * | 3/1999 | Lukas et al. ............... 137/884 |
| 6,109,303 | A | * | 8/2000 | Itafuji et al. ............... 137/884 |
| 6,729,353 | B1 | * | 5/2004 | Nguyen ..................... 137/884 |

(Continued)

OTHER PUBLICATIONS

ANSI/ISA-76.00.02-2002, Modular Component Interfaces for Surface-Mount Fluid Distribution Components—Part 1: Elastomeric Seals; Instrumentation, Systems, and Automation Society (2002).
Bauer et al., Development of a rapid prototyping process chain for the production of ceramic microcomponents, *Journal of Materials Science*, 37:3127-3140 (2002).
CPAC NeSSI website, New Sampling/Sensor Initiative (NeSSI™), http://www.cpac.washington.edu/NeSSI/NeSSI.htm (2005).
NeSSI™ (New Sampling/Sensor Initiative) Generation II Specification (2003-2004).

*Primary Examiner*—John Fox
(74) *Attorney, Agent, or Firm*—Craig A. Fieschko, Esq.; DeWitt Ross & Stevens S.C.

(57) ABSTRACT

A modular fluid handling device includes at least one block having opposing block faces shaped as tessellating regular polygons, and a series of block sides therebetween. Each block includes a central bore extending between the block faces, and channels extending into the block sides and intersecting with the central bore. The blocks may be rapidly horizontally and/or vertically affixed with their channels and/or bores in communication to form a fluid handling device having the desired configuration (e.g., with the channels/bores forming a desired process flow path, fluid circuit, or the like). Inserts complementarily fit within the bores of selected blocks can then bear components such as valves, filters, turbines or stirrers, heating or cooling elements, pumps, sensors, or other equipment, so that a block can be adapted to fulfill desired purposes by simply installing the desired inserts.

22 Claims, 2 Drawing Sheets

U.S. PATENT DOCUMENTS

| | | |
|---|---|---|
| 6,749,814 B1 | 6/2004 | Bergh et al. |
| 6,818,183 B1 | 11/2004 | Hajduk |
| 6,824,577 B1 | 11/2004 | Deshpande |
| 7,045,358 B1 * | 5/2006 | Chandler, Jr. .............. 436/34 |
| 2001/0006611 A1 | 7/2001 | Koski et al. |
| 2002/0001538 A1 | 1/2002 | Hajduk et al. |
| 2004/0018124 A1 | 1/2004 | Filippi et al. |
| 2004/0136873 A1 | 7/2004 | Meier |

* cited by examiner

MODULAR FLUID HANDLING DEVICE

FIELD OF THE INVENTION

This document concerns an invention relating generally to devices for processing and sampling of gases and liquids, and more specifically to devices allowing rapid construction of fluid reactors, distillers, extractors, homogenizers, filtration/separation devices, process models (e.g., for modeling engine cycles, refrigeration cycles, etc.), and other devices for handling fluids.

BACKGROUND OF THE INVENTION

Fluid handling devices consisting of fermenters, distillers, filtration tanks, evaporators, etc. (or combinations of these components) are exceedingly common in industry and in research labs. Researchers and engineers also often need to experiment with models for common thermodynamic cycles, e.g., refrigeration cycles (vapor compression cycle, Einstein cycle, etc.) and power cycles (Otto cycle, Diesel cycle, Brayton cycle, Rankine cycle, etc.). While it is often desirable to generate prototypes or small-scale versions of such devices, they are usually time-consuming, difficult, and expensive to construct. One approach commonly used in laboratories is to connect glassware vessels (e.g., flasks, towers, heat exchangers, etc.) with rubber tubing so that the vessels form some desired fluid process model, but even apart from the significant time and expense required for their construction, these are quite fragile, are unsuitable for pressurized processes, and are also usually unsuitable for processes involving extreme temperatures or corrosive materials (owing to the weakness of the tubing). In some cases, more durable fluid handling devices can be formed from metal vessels connected with (for example) brazed copper tubing, but these involve even greater time, cost, and fabrication burdens.

Some systems (such as that of U.S. Pat. No. 5,841,036 to Mayeaux) and standards (ANSI/ISA-76.00.02-2002) have been developed in an attempt to reduce these shortcomings of fluid handling devices. However, prior efforts have thus far not resulted in fluid handling devices which can be rapidly assembled in nearly unlimited configurations, which can be used across a wide range of temperatures and pressures, and which are relatively inexpensive.

SUMMARY OF THE INVENTION

The invention involves a modular fluid handling device which is intended to at least partially solve the aforementioned problems. To give the reader a basic understanding of some of the advantageous features of the invention, following is a brief summary of preferred versions of the fluid handling device. As this is merely a summary, it should be understood that more details regarding the preferred versions may be found in the Detailed Description set forth elsewhere in this document. The claims set forth at the end of this document then define the various versions of the invention in which exclusive rights are secured.

Looking to the accompanying FIGS. 1 and 2 for an exemplary version of the modular fluid handling device, the device includes at least one block, depicted at 100 in FIG. 1 and at 100a, 100b, 100c, and 100d in FIG. 2 (though these will be collectively referred to as block 100). Each block 100 has a block top face 102, an opposing block bottom face (not visible in the drawings), and a series of block sides 104 therebetween. The block faces 102 are preferably shaped as tessellating regular polygons (e.g., hexagons, squares, etc.), whereby a series of identical blocks 100 may be fit together in side-to-side relationship to form an array of blocks 100 without spaces therebetween. The blocks 100 may also be vertically stacked to form multiple levels, and at any vertical level, blocks 100 may be horizontally arrayed as well. Each block 100 includes a central bore 106 extending between the block faces 102, with the central bore 106 providing an enlarged space for reaction, distillation, fluid storage, or other purposes. Within each block 100, channels 108 also extend into the block sides 104 and intersect with the central bore 106, with the channels 108 thereby allowing fluid to communicate between the central bores 106 of adjacent blocks 100. As will be evident from the following discussion, the blocks 100 may be rapidly horizontally and/or vertically affixed with their channels 108 and/or bores 106 in communication to form a fluid handling device having the desired configuration (e.g., with the channels 108 and bores 106 forming a desired process flow path, fluid circuit, or the like). Inserts 110 (shown in FIG. 2 as 110a, 110b, 110c, and 110d, which will also be collectively referred to as 110) can then be complementarily fit within the bores 106 of selected blocks 100. These inserts 110 can bear components such as valves, filters, turbines or stirrers, heating or cooling elements, pumps, sensors, or other equipment, so that a block 100 can be adapted to fulfill desired purposes by simply installing the desired inserts 110. Inserts 110 could also or alternatively simply contain insert passages 112 oriented in desired directions to direct fluid flow as desired between the bores 106 and channels 108 of adjacent blocks 100, or could simply contain empty chambers for storage, accumulation, distillation/precipitation processes, etc.

The central bore 106 (and any insert 110 received therein) preferably has a polygonal cross-sectional area so that an insert 110 fit therein cannot rotate in the block 100, and thus an insert 110 will maintain any desired orientation with respect to the bores 106 and/or with respect to selected channels 108 of the block 100. As for the channels 108, these are preferably centrally located in their block sides 104, and extend from the central bores 106 at equal angular intervals (i.e., at every 60 degrees about the hexagonal blocks 100). As a result, the channels 108 in adjacent blocks 100 are automatically aligned when multiple blocks 100 are placed in an abutting horizontal array. Additionally, each channel 108 preferably extends between opposing block sides 104 so that it can be used for fluid throughput from one block side 104 to the other, or alternatively a channel 108 can be used to simply communicate fluid to the central bore 106 if the channel 108 is plugged at one of its sides (as by an insert 110 blocking flow into one of the channel sides, as will be discussed below). Thus, a user can array the blocks 100 both horizontally (with communicating channels 108) and vertically (with communicating central bores 106) to effectively create a network of passages having lengths and configurations desired by the user. Flow can also be blocked from certain channels 108 (or bores 106) by the use of an appropriate insert 110, as exemplified by the insert 110 of FIG. 1, which only allows fluid communication between the large-diameter channels 108 extending through opposing sides 104 of the block 100.

To better tailor fluid throughput to desired levels, it is also useful to have at least some differently-sized channels 108 in each block 100, as illustrated by the channels 108 of large, medium, and small diameter in the block 100 of FIG. 1. Further, to better avoid leakage from channels 108 at the junctures between adjoining blocks 100, the ends of the channels 108 preferably include countersunk depressions 114 to accommodate O-rings 116 between adjoining blocks 100 and their channels 108 (with no such O-rings being illustrated in FIG. 1, save for at countersunk areas formed about the insert passage 112 in the insert 110).

The central bores 106 can also be closed (if desired), preferably by the use of a closure plate 118. Each closure plate 118 is bounded by a perimeter shaped identically to the block face(s) 102 to which it is to be fit, with the closure plate 118 being adapted to rest in a seated position on a block face 102 with the surfaces of the closure plate's perimeter resting coplanarly with the block sides 104. Fastener openings 120 and 122 are defined in the block faces 102 and in the closure plate 118, with the fastener openings 122 of the closure plate 118 being aligned with the face fastener openings 120 in the block faces 102. Fasteners 124 may then be inserted into both the closure plate 118 and the block face 102 upon which the closure plate 118 is seated to affix the closure plate 118 to the block face 102.

Blocks 100 may be affixed together in vertically stacking relationship, as with blocks 100c and 100d in FIG. 2, to arrange adjoining bores 106 into elongated vertical passageways or to otherwise construct a desired device for the handling of fluids. The face fastener openings 120 in the block faces 102 can be situated so that when blocks 100 are situated in face-to-face abutting relationship, the face fastener openings 120 are coaxially aligned. This allows the blocks 100 to be affixed together in face-to-face abutment by extending fasteners 124 between the aligned face fastener openings 120 of the abutting blocks 100.

Similarly to the vertically adjoining block faces 102, the horizontally adjoining block sides 104 are also preferably connectable as well, with these side connections further providing rigidity to the constructed fluid handling device and better ensuring leak-resistant communication of fluids between adjacent blocks 100. Side connections can be made by including side fastener openings 126 in the block sides 104, whereby a block 100 may be affixed by fasteners to a horizontally adjacent block 100. The side fastener openings 126 are preferably situated on the block sides 104 so that when the blocks 100 are arrayed in side-by-side abutting relationship with aligned channels 108, their side fastener openings 126 are coaxially aligned to allow a side fastener 128 to extend therebetween. Most preferably, each side fastener opening 126 is defined in both a block side 104 and also a block face 102 so that the side fasteners 128 are installable between block sides 104 from the block faces 102. Additionally, once installed, these side fasteners 128 are preferably flush with the block faces 102 so that they do not interfere with vertical stacking of blocks 100. It is also useful to provide each side fastener opening 126 with a cross-section which changes as the side fastener opening 126 extends into the block side 104, so that a complementarily-shaped side fastener 128 will fit into the side fastener opening 126 in mating, key-like fashion. A preferred side fastener configuration is one which has a cross-sectional area which decreases at the middle of its length, and thus its complementary side fastener opening 126 has an expanding cross-section as it extends into the block side 104. This arrangement is exemplified by the dogbone-shaped (or wrench-shaped) side fasteners 128 and side fastener openings 126 shown in the drawings. Such fasteners 128 and openings 126 tightly maintain adjacent blocks 100 together, and the mouth 130 of the wrench, if present, allows easy insertion of a screwdriver tip to allow a side fastener 128 to be more easily lifted for removal.

It is also useful if the blocks 100 can be mounted on a sturdy base to impart greater rigidity/stability to an array of affixed blocks 100. Such a base is preferably provided in the form of a mounting plate 132 having a mounting surface 134 sized and configured to receive several abutting horizontally-arrayed blocks 100 thereon. The mounting surface 134 includes plate fastener openings 136 situated such that when several arrayed blocks 100 are placed on the mounting surface 134, the plate fastener openings 136 can be coaxially aligned with the face fastener openings 120 (and/or the closure plate fastener openings 122) so that fasteners 124 can be used to affix the arrayed blocks 100 to the mounting plate 132. The mounting plate 132 could simply take the form of pegboard or a similar perforated substrate, so long as the apertures in the pegboard align with the face fastener openings 120 and closure plate fastener openings 122.

Further advantages, features, and objects of the invention will be apparent from the following detailed description of the invention in conjunction with the associated drawings.

DETAILED DESCRIPTION OF PREFERRED VERSIONS OF THE INVENTION

Figure 1:
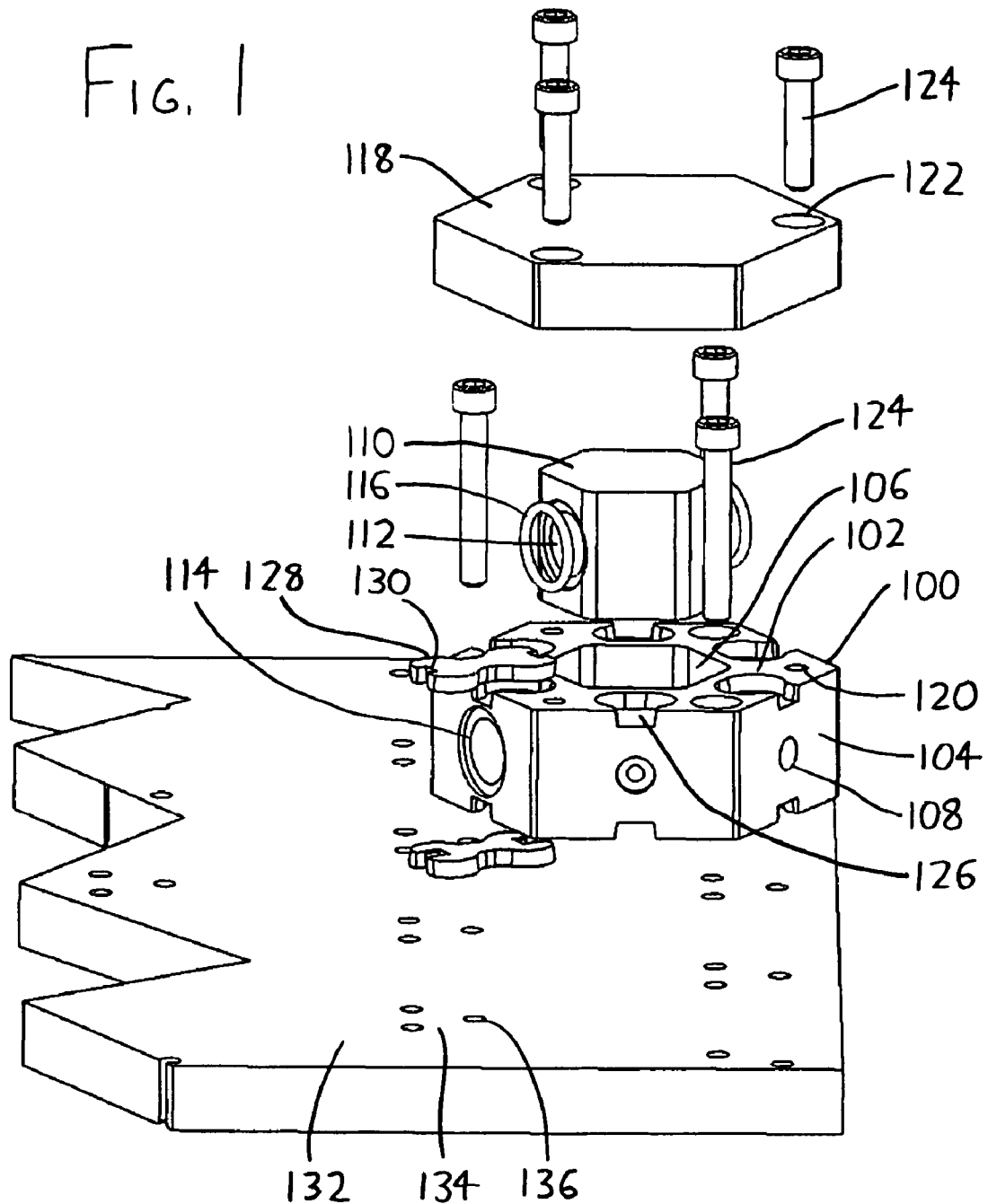
FIG. 1 is an exploded perspective view of a block 100 above a mounting plate 132, showing an insert 110 and closure plate 118 (and associated face and closure plate fasteners 124, side fasteners 128, etc.) exploded outwardly as well.

As previously noted, the block faces 102 (and indeed the axial cross-sections of each block 100) are preferably shaped as tesselating regular polygons. A regular polygon is a polygon where all sides have the same size, and all of the interior angles are the same; examples are equilateral triangles, squares, pentagons, hexagons, etc. A tesselating regular polygon is a regular polygon wherein several polygons of the same size and type can fit snugly together in a side-by-side array which completely covers the area across which the polygons are arrayed; examples are triangles, squares, and hexagons. (Note that polygons other than regular polygons may tesselate, e.g., rectangles and parallelograms.) Symmetric tesselating regular polygons are those where each side has a parallel opposing side, e.g., squares and hexagons. These are particularly preferred shapes for blocks 100 since they allow channels 108 to extend between, and be centrally/symmetrically located on, opposing block sides 104.

The blocks 100 and closure plates 118 are preferably formed of heat- and corrosion-resistant materials such as stainless steel, but other materials can be used. Block materials can be specially chosen to achieve desired objectives; for example, a block 100 or closure plate 118 could be formed of plastic or ceramic materials to reduce heat conduction, or of transparent plastic or glass to allow visualization of its contents, etc. A user could then choose a mixture of blocks 100 and/or closure plates 118 having desired characteristics, and assemble them to better fulfill the intended purpose of the fluid handling device.

Exemplary dimensions for the blocks 100 are 1 inch thickness between the block faces 102, block sides 104 which are each 1.5 inches wide, and a central bore 106 having an average diameter of 1 inch. Exemplary dimensions for the channels 108 are ½ inch, ¼ inch, and ⅛ inch. However, different dimensions could be used, and it is also possible to use different blocks 100 having different dimensions in the same fluid handling device; for example, different blocks 100 might be formed with 1 inch, 2 inch, and 4 inch thicknesses for use together in the same fluid handling device, with the 2 inch block effectively taking the place of 2 vertically stacked 1-inch blocks, the 4 inch block effectively taking the place of 4 vertically stacked 1-inch blocks (or 2 vertically-stacked 2-inch blocks), etc.

In similar respects, the closure plates 118 preferably have a thickness which is some integral divisor of the standard thickness of a block 100 (i.e., the closure plate thickness=1/n*block thickness, wherein n=1, 2, 3, . . . ). Where a user vertically arrays blocks 100 and closure plates 118, this allows a user to readily realign blocks 100 in common planes by simply stacking (and preferably attaching) extra closure plates 118 until the blocks 100 situated atop the closure plates 118 rest in the desired plane. While each of the closure plates 118 is illustrated with three (countersunk) fastener openings 122, they could bear additional fastener holes (e.g., at all corners).

The face fastener openings 120 and closure plate fastener openings 122 are preferably formed with identical diameters and threading, e.g., so that both can accept 10–32 UNF SHC hex screws. In the exemplary blocks 100 shown in the drawings, three of the face fastener openings 120 are depicted as being countersunk, with three non-countersunk face fastener openings 120 interspersed therebetween. The countersunk face fastener openings 120 are used as the insertion point for the fasteners 124 affixing vertically-adjoining blocks 100 so that the fasteners 124 will not have protruding heads once fully inserted (see, for example, block 100a in FIG. 2). The non-countersunk face fastener openings 120 are used to receive the ends of fasteners 124 extending from adjacent vertically-stacked blocks 100, or to receive fasteners 124 extending from the closure plates 118 to the block faces 102. Preferably, each of the face fastener openings 120 is countersunk at one of the block faces 102, i.e., the non-countersunk fastener openings 120 in FIG. 1 are countersunk where they emerge at the opposite (unshown) face of the block 100, and the countersunk fastener openings 120 in FIG. 1 are not countersunk where they emerge at the opposite (unshown) face of the block 100. Thus, the top and bottom faces 102 of the blocks 100 are effectively interchangeable. Note that the interspersing of the countersunk fastener openings 120 with the non-countersunk fastener openings 120 leads to the staggered fastener arrangement best seen in FIG. 2, wherein the closure plate 118 has fasteners 124 inserted in its countersunk fastener openings 122 to extend into non-countersunk fastener openings 120 in block 100d; block 100d then has fasteners 124 inserted within the countersunk fastener openings 120 to extend into the non-countersunk fastener openings 120 in block 100c (with these fasteners 124 being staggered 60 degrees from the fasteners 124 extending from the closure plate 118); and block 100c has fasteners 124 inserted within the countersunk fastener openings 120 to extend into the mounting plate fastener openings 136 (with these fasteners 124 being staggered 60 degrees from the fasteners 124 extending from the block 100c). In effect, each vertically stacked component has its fasteners 124 rotationally staggered with respect to the adjacent component. Alternatively, all fastener openings 120 and 122 could be countersunk so that any could serve as the insertion point for a fastener 124, and/or elongated fasteners, threaded rods, or smooth tie rods with threaded ends could be used to simultaneously vertically affix more than two blocks 100 together.

The channels 108 preferably include countersunk depressions 114 at the block sides 104 so that O-rings (not shown in the drawings) can be fit to the ends of the channels 108 between horizontally adjoining blocks 100, thereby enhancing leak-resistant sealing. The insert 110 in FIG. 1 is shown with a similar countersunk O-ring depression (as well as O-ring 116), though such depressions could also or alternatively be formed on the channel ends intersecting the bores 106.

As previously noted, the dogbone shape of the side fasteners 128 is useful to restrain adjoining blocks 100 together, and the furcated tips of the side fasteners 128 allow the head of a screwdriver to be inserted to easily lift the side fasteners 128 from their side fastener openings 126. On each side fastener 128, the member 130 bridging the furcations extends further toward the tips of the furcations on one side of the side fastener 128 than on the other (note the apparently different lengths of the furcations in FIG. 1), and thus this bridging member 130 effectively forms a concavity between the side fastener 128 and the block 100 when the side fastener 128 is installed. This concavity can receive a screwdriver tip to further assist in removal of a side fastener 128.

Figure 2:
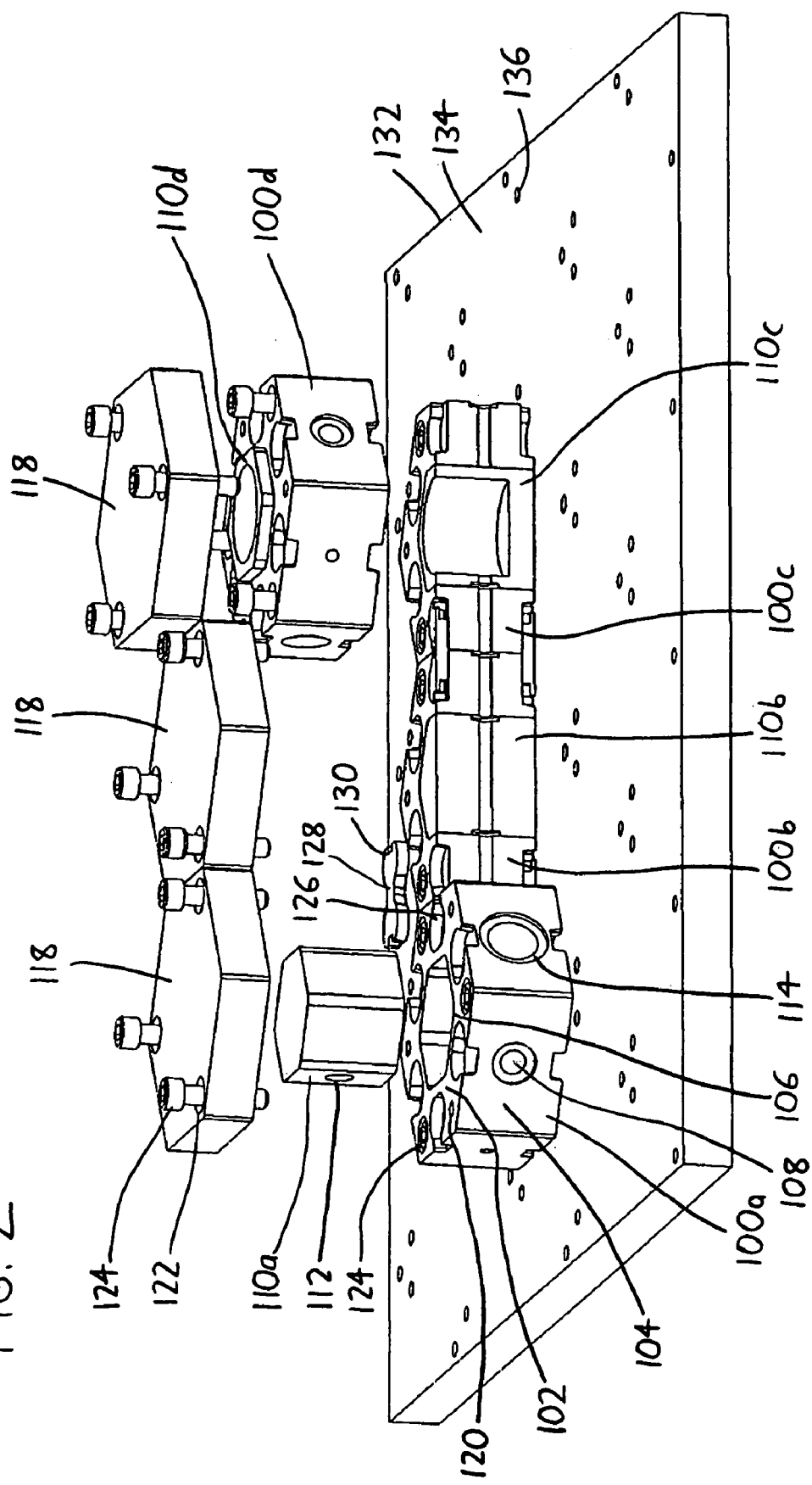
FIG. 2 is a partially exploded perspective view showing blocks 100a, 100b, and 100c horizontally arrayed above a mounting plate 132 (with blocks 100b and 100c and their associated inserts 110a and 110b being shown sectioned along their midplanes), with block 100d exploded outwardly from the block 100c upon which it is vertically stacked, and with insert 110a and closure plates 118 each being exploded vertically outwardly from their blocks 100 below.

The inserts 110 depicted in the drawings are simple, with insert 110 in FIG. 1, and inserts 110a and 110b in FIG. 2, simply containing an insert passage 112 allowing fluid to horizontally traverse a block channel 108. Similarly, insert 110c allows fluid to pass from a channel 108 to a vertical well which further extends into insert 110d. However, inserts 110 can be configured to do more than simply direct fluid flow between desired channels 108 and bores 106, and can contain sensors (e.g., thermocouples, ph sensors, conductivity sensors, pressure transducers, etc.), heating or cooling elements (preferably of the thermoelectric type), stirrers or pumps for driving fluid (or conversely turbines which can be driven by fluid flow), valves, sources of laser or other light, spark or arc emitters, or virtually any other components useful in fluid handling systems.

It should be understood that an exemplary version of the invention has been shown and described above to illustrate preferred features of the invention. Apart from rearranging these features and/or omitting or adding them in different forms and combinations, other modifications are also considered to be within the scope of the invention. Following is an exemplary list of such modifications.

First, if desired, some or all channels 108 could be tapped with internal threading so that components such as threaded input/output ports, gas traps, probe/sensor mounts, etc. can be more easily installed. In similar respects, some or all closure plates 118 may bear centrally-located ports which open onto the central bore 106 of a block 100 when installed on its block face 102, and wherein such ports might ordinarily remain closed via a threaded plug or fastener. These ports could also or alternatively be used to accommodate sampling, measuring, or other devices.

Second, flow can be blocked from undesired channels 108 by structures other than inserts 110 (for example, by insertion of a plug, which might be threaded to engage a complementarily threaded channel interior). Similarly, rather than using closure plates 118, the central bores 106 could instead be closed by the use of appropriately-shaped plugs or the like.

Third, the side fasteners 128 can assume a wide variety of forms other than those described above. As a simple example, the side fasteners 128 can simply take the form of conventional threaded fasteners which extend through side fastener openings 126 in the block faces 102 to exit the block sides 104 (and then enter an adjoining block 100), with such side fastener openings 126 preferably being countersunk at their entries. As another example, the side fasteners 128 could take the form of links which bridge side fastener openings 126 similar to those shown in the drawings, and wherein the ends of the links are affixed to their blocks 100 with smaller fasteners. As yet another example, spring-loaded or wire clips which can be compressed, and which expand to engage adjoining blocks 100 when released, could be used. Thus, it should be understood that virtually any known fastening means for fastening two abutting members together could be used for the side fasteners 128.

Fourth, the exemplary blocks 100 shown in the drawings use the same face fasteners openings 120 to both affix blocks 100 together in face-to-face relationship, and to affix blocks 100 to closure plates 118 and/or mounting plates 132. However, it is also possible to provide different fastener openings for these purposes (e.g., the placements, diameters, or other characteristics of the fasteners and fastener openings used to affix blocks 100 together might be different from those used to affix closure plates 118 or mounting plates 132 to blocks 100).

The invention is not intended to be limited to the preferred versions described above, but rather is intended to be limited only by the claims set out below. Thus, the invention encompasses all different versions that fall literally or equivalently within the scope of these claims.

What is claimed is:

1. A modular fluid handling device comprising a series of blocks, each having a block top face, an opposing block bottom face, and a series of block sides therebetween, wherein:
   a. the block faces are shaped as tessellating regular polygons,
   b. each block includes a central bore extending between the block faces, wherein the central bore has a polygonal cross-section, whereby an insert having a complementarily-shaped polygonal perimeter may be non-rotatably fit within the central bore;
   c. each block includes channels extending between opposing block sides, wherein the channels intersect at the central bore and extend therefrom at equal angular intervals;
   wherein:
   (1) the blocks may be arrayed together in side-to-side abutting relationship to form a two-dimensional array of blocks wherein abutting block sides have their channels coaxially aligned;
   (2) the blocks may be arrayed together in face-to-face abutting relationship to form a stacked array of blocks wherein abutting blocks have their bores coaxially aligned.

2. The modular fluid handling device of claim 1 wherein the block faces are shaped as hexagons.

3. The modular fluid handling device of claim 1 wherein each block side has a channel centrally defined therein.

4. The modular fluid handling device of claim 3 wherein each block includes channels of different sizes.

5. The modular fluid handling device of claim 1 wherein each block:
   a. includes side fastener openings in its block sides, and
   b. has side fastener openings which are coaxially aligned with the side fastener openings in the block side of another of the blocks which is situated in side-by-side abutting relationship,
   whereby the blocks can be affixed together in side-to-side abutment by extending a side fastener between the aligned side fastener openings of the abutting blocks.

6. The modular fluid handling device of claim 5 wherein each side fastener opening is:
   a. defined in both a block side and a block face, and
   b. has an expanding cross-section as it extends into the block side.

7. The modular fluid handling device of claim 6 in combination with an elongated side fastener having a cross-sectional area which decreases at the middle of its length.

8. The modular fluid handling device of claim 1 wherein each block:
   a. includes face fastener openings in its block faces, and
   b. has face fastener openings which are coaxially aligned with the face fastener openings in the block face of another of the blocks which is situated in face-to-face abutting relationship,
   whereby the blocks can be affixed together in face-to-face abutment by extending a fastener between the aligned face fastener openings of the abutting blocks.

9. The modular fluid handling device of claim 1:
   a. further comprising a closure plate bounded by a perimeter shaped as a tesselating regular polygon, the closure plate being adapted to rest in a seated position on a block face with the surfaces of the closure plate's perimeter resting coplanarly with the block sides,
   b. wherein fastener openings are defined in the faces of the blocks and in the closure plate, the fastener openings of the closure plate being aligned with the fastener openings in each block, whereby a fastener may be inserted into both the closure plate and a block whereupon the closure plate rests in the seated position.

10. The modular fluid handling device of claim 9:
   a. further comprising amounting plate having amounting surface sized and configured to receive several blocks thereon in side-to-side abutting relationship, the mounting surface baying plate fastener openings therein;
   b. wherein the plate fastener openings are arrayed such that when several blocks are received thereon in side-to-side abutting relationship, the plate fastener openings coaxially align with the block fastener openings.

11. A modular fluid handling device comprising a series of blocks, each having opposing top and bottom block faces and a series of block sides therebetween, wherein each block includes:
   a. a central bore extending between the block faces, wherein the central bore has a polygonal cross-section, whereby an insert having a complementarily-shaved polygonal perimeter may be non-rotatably fit within the central bore;
   b. at least two channels, each channel being centrally defined in a block side and intersecting the central bore;
   c. side fastener openings in the block sides, whereby a block may be affixed to a horizontally adjacent block;
   d. face fastener openings in the block faces, whereby a block may be affixed to a vertically adjacent block; and
   wherein the blocks are sized and configured to fit in both:
   (1) a horizontal side-to-side two-dimensional array with the channels in each block side being coaxial with the channels in an abutting block side, and
   (2) a vertical face-to-face stack with the bores of the blocks in the array coaxially aligned.

12. The modular fluid handling device of claim 11 wherein the block faces of the blocks have outer perimeters shaped as hexagons.

13. The modular fluid handling device of claim 11 wherein the channels within each block intersect at the central bore and extend therefrom at equal angular intervals.

14. The modular fluid handling device of claim 11 wherein each block includes channels of different sizes.

15. The modular fluid handling device of claim 11 wherein:
 a. each side fastener opening:
  (1) is defined in both a block side and a block face, and
  (2) has an expanding cross-section as it extends into the block side;
 b. the modular fluid handling device further comprises an elongated side fastener shaped to be complementarily received in coaxial adjacent side fastener openings.

16. The modular fluid handling device of claim 11:
 a. further comprising a closure plate bounded by a perimeter shaped such that the closure plate may rest in a seated position on a block face with the surfaces of the closure plate's perimeter resting coplanarly with the block sides;
 b. wherein the closure plate has face fastener openings defined therein, the face fastener openings of the closure plate being aligned with the face fastener openings in the block face when the closure plate rests in a seated position thereon.

17. The modular fluid handling device of claim 11:
 a. further comprising a mounting plate having a mounting surface sized and configured to receive several blocks thereon in a horizontal side-to-side two-dimensional array, the mounting surface having plate fastener openings therein;
 b. wherein the plate fastener openings are arrayed such that when several blocks are situated on the mounting plate in a horizontal side-to-side two-dimensional array, the plate fastener openings coaxially align with the face fastener openings.

18. A modular fluid handling device comprising:
 a. a block having opposing block faces and a series of block sides therebetween, wherein:
  (1) the block faces are shaped as tessellating regular polygons, whereby a series of identical blocks may be fit together in side-to-side relationship to form an array of blocks without spaces therebetween;
  (2) a central bore extends between the block faces; and
  (3) channels extend between opposing block sides, wherein the channels intersect with the central bore;
  (4) the block includes side fastener openings:
   a. defined in both a block side and a block face, and
   b. having a cross-section which changes as the side fastener opening extends into the block side;
 b. a closure plate bounded by a perimeter shaped as a tesselating regular polygon, the closure plate being adapted to rest in a seated position on a block face with the surfaces of the closure plate's perimeter resting coplanarly with the block sides; and
 c. face fastener openings in the closure plate and block, the face fastener openings being aligned whereby a fastener may be inserted into both the closure plate and the block when the closure plate rests in the seated position on the block.

19. The modular fluid handling device of claim 18 wherein:
 a. each block side has a channel centrally defined therein; and
 b. at least some of the channels are difibrently sized.

20. The modular fluid handling device of claim 19 wherein the channels intersect at the central bore and extend therefrom at equal angular intervals.

21. The modular fluid handling device of claim 18:
 a. further comprising a mounting plate having a mounting surface sized and configured to receive the block and several identical blocks thereon fit in a side-to-side abutting array, the mounting surface having plate fastener openings therein;
 b. wherein the plate fastener openings are arrayed such that when the block array is received thereon, the plate fastener openings coaxially align with the face fastener openings of the blocks.

22. The modular fluid handling device of claim 18 wherein the central bore has a polygonal cross-section, whereby an insert having a complementarily-shaped polygonal perimeter may be non-rotatably fit within the central bore.

* * * * *